May 11, 1937.  H. C. REYMOND  2,080,186
LATITUDE AND LONGITUDE METER FOR SHIPS
Filed July 25, 1934   2 Sheets-Sheet 1

Inventor:
H. C. Reymond

May 11, 1937. H. C. REYMOND 2,080,186

LATITUDE AND LONGITUDE METER FOR SHIPS

Filed July 25, 1934 2 Sheets-Sheet 2

Inventor:
H. C. Reymond

Patented May 11, 1937

2,080,186

UNITED STATES PATENT OFFICE 2,080,186

LATITUDE AND LONGITUDE METER FOR SHIPS

Henry Claude Reymond, Paris, France

Application July 25, 1934, Serial No. 736,958
In France August 5, 1933

7 Claims. (Cl. 235—61)

The object of this invention is to provide a device for measuring the displacements in longitude and in latitude of a ship or an air-ship, knowing its speed and the followed route; said device comprising means (per se) for creating a voltage or a current proportional to the speed of the ship, means for resolving this voltage or current into two components, one proportional to the cosine and the other to the sine of the route angle of the ship, and integrating devices, such as volt- or amperehourmeters, actioned each by one of said voltage components.

A further object of the invention is to provide means for measuring not only the variations in longitude and in latitude of the ship, but also the total values of the said variations, i. e. to calculate the bearing by means of a device reducing to degrees of an arc (for instance to hundredths of a centesimal degree), the indications given in units of length by the longitude meter, the latitude meter indicating the latitude without any correction.

Two embodiments of the invention are hereinafter described, by way of example, and illustrated in the annexed drawings.

Figure 1:
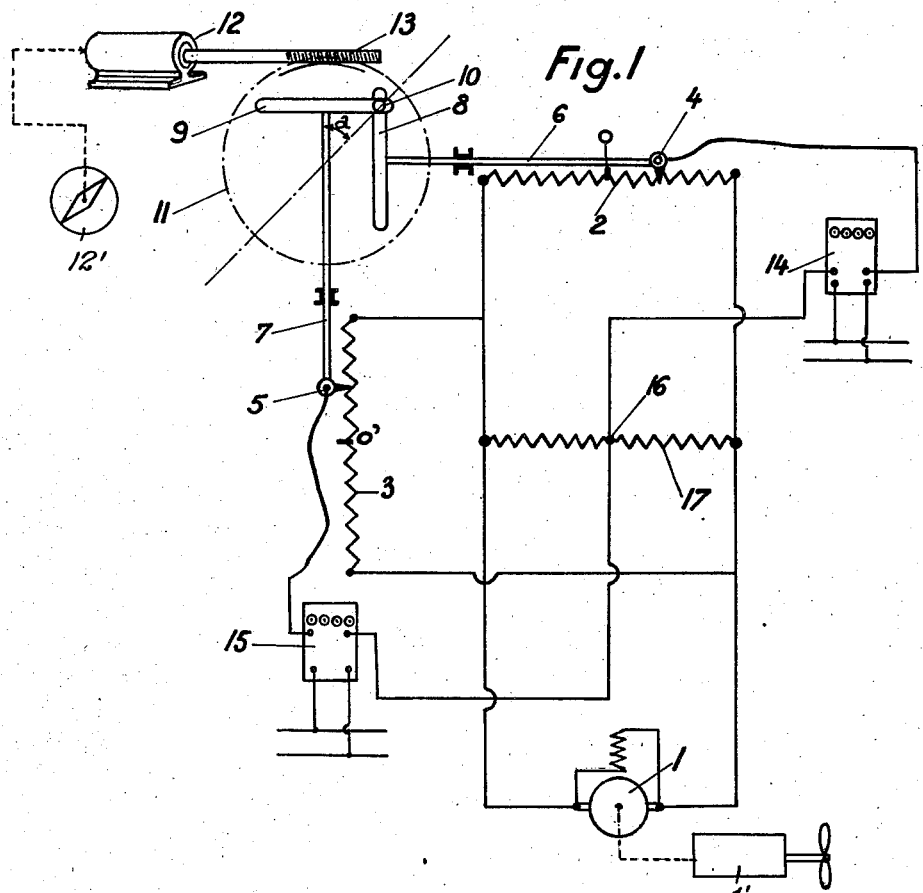
Figure 1 is a first embodiment working on direct current.

The device illustrated in Figure 1 comprises a direct current generator 1 supplying a voltage rendered proportional to the speed of the ship by any known means for instance by subjecting this generator to the control of a screw log 1' or by driving said generator by such a log. This generator feeds, in parallel, two potentiometers 2, 3 provided with sliding contacts 4, 5. These two sliders are actuated respectively by two rods 6, 7, integral with two alidades 8, 9 at right angles to one another, adapted to move in a parallel direction to themselves and driven by the lug 10 of a disc 11, termed the cape-disc directed by the ship compass. To that purpose the cape-disc 11 is provided on its circumference with teeth and is driven, by means of a worm 13, by a motor 12 subjected to a gyroscopic compass 12' for instance, in such a manner that the angle $a$ formed between the vertical diameter of the disc 11 and the radius passing through the lug 10 represents the route-angle of the ship. The displacements of the two alidades 8 and 9 are therefore proportional to sine $a$ and to cos $a$. The length of the rods 6 and 7 is such that when each alidade 8, 9 is located along a diameter of the disc 11, the sliders 4 and 5 should be positioned at the middle-points O and O' of their respective potentiometers.

Two volthourmeters 14 and 15 are mounted between the sliders 4 and 5 and a neutral point of the feeding circuit, for instance the middle point 16 of a third resistance 17 mounted in parallel with the resistances 2 and 3.

As the voltage of the generator 1 and therefore the currents in the potentiometers 2 and 3 are proportional to the speed of the ship, and as, on the other hand, the lengths O—4 and O'—5 are respectively proportional to sine $a$ and to cos $a$, it is obvious that the voltages applied to the meters 14 and 15 are proportional to the instantaneous speeds of displacement of the ship in longitude and in latitude. It is therefore sufficient to calibrate suitably these meters for reading directly the corresponding displacements.

Figure 2:
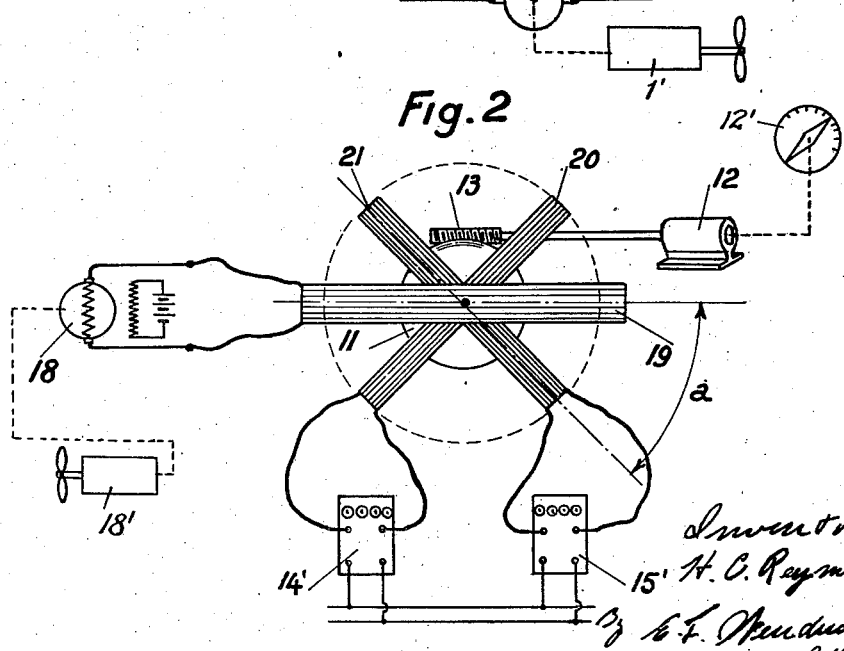
Figure 2 is a second embodiment working on alternating current.

The second embodiment of the invention illustrated in Fig. 2 shows a particularly simple solution of the same problem, and it consists in employing an alternating current generator 18 supplying a single-phase voltage also rendered proportional to the speed of the ship for instance by means of a log 18'. This generator feeds a fixed coil 19 the flux of which induces electromotive forces into two frames 20 and 21 movable about a diameter of the fixed coil 19 and connected each to one of the meters 14' and 15'. The frames 20 and 21 are integral with one another and form a right angle; they are driven in rotation by a cape-disc 11 actuated by a motor 12 subjected, as above, to a compass 12'. The device is arranged in such a manner that one of the frames, for instance the frame 21 should form with the fixed coil 19 the route-angle $a$. The flux induced into the movable frames 20, 21 by the fixed coil 19 being, on one hand, proportional to the speed of the ship and, on the other hand, to the cosine and sine respectively of the angle of inclination of these frames upon the fixed coil, it is obvious that the electromotive forces induced into the coils 20 and 21 are respectively proportional to the speeds of displacement in latitude and in longitude, so that the meters 14', 15' indicate, as above, the values of these displacements.

The device hereinbefore described may also be adapted to compute the bearings of the ship, i. e. to provide the absolute values of the latitude and the longitude. In this connection it is to be noted that the readings given for the displacements by the latitude meters in length units, are proportional to the readings which would express the same latitude displacements in angle units, for instance in hundredths of centesimal degrees (1/100 of a centesimal degree in latitude being always equal to 1 km.). These indications may therefore be utilized as angular indications, by providing, if necessary, the latitude meter with a second scale. On the contrary, the readings expressing in units of length (in kilometers) the longitude displacements, must obviously be divided by the cosine of the latitude for giving a reading proportional to the measure of this displacement in hundredths of a centesimal degree.

This reduction may be effected easily by feeding the winding of the longitude meter 14 by means of a member subjected to the latitude meter 15.

This solution cannot of course be maintained up to the poles, where, for a determined displacement of the ship, the longitude varies to infinity. It meets, however, entirely all necessities within the practical limits of normal navigation, for instance up to latitudes of 60 or 70°.

Figure 3:
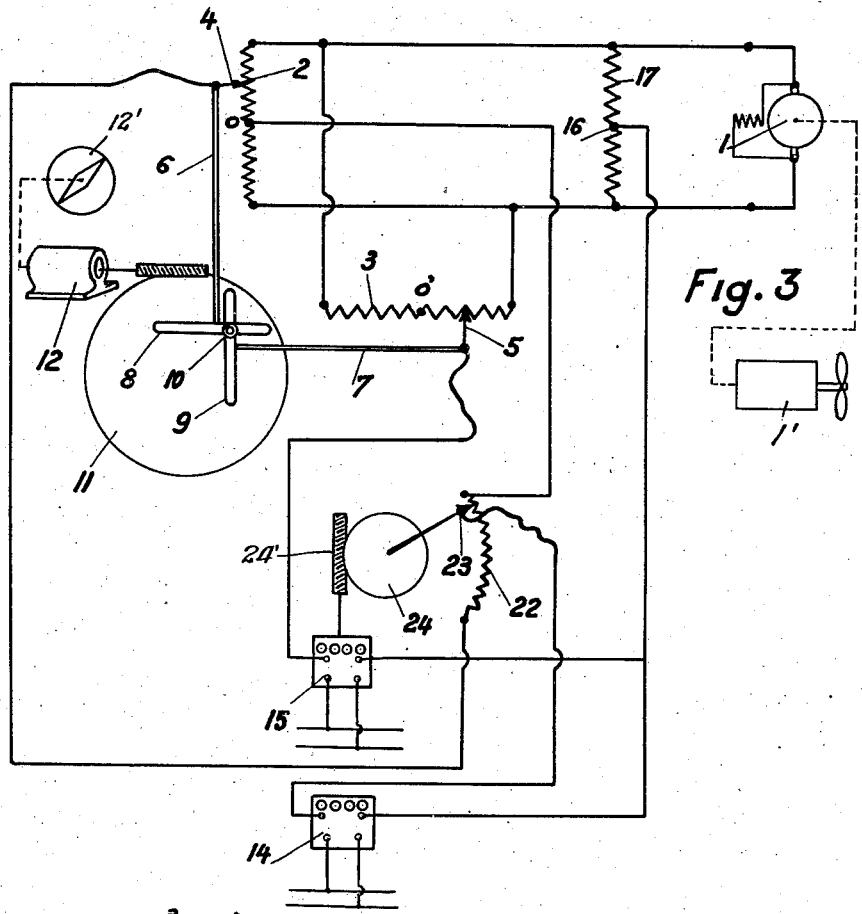
Figures 3 and 4 show a modified form of the device providing directly the longitude and the latitude.

In the case of the direct current device (Figure 3) the member subjected to the latitude meter may be a potentiometer 22 connected between the middle point O of the longitude potentiometer 2 and the corresponding slider 4. This potentiometer 22 is provided with a slider 23 connected to the longitude meter 14 and controlled by the latitude meter 15 through the means of a screw 24' and of a disc 24 in such a manner that the fraction of the resistance 22 utilized for feeding the longitude meter 14 shall vary inversely as the cosine of the latitude given by the meter 15.

Figure 4:
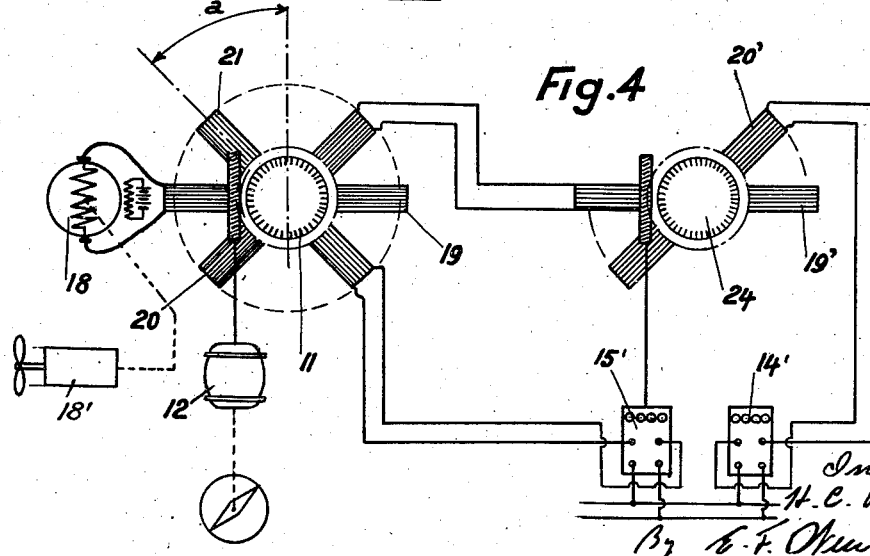

In the case of the alternating current device (Figure 4), the longitude meter 14' is fed by the coil 20 by means of a second fixed coil 19' inducing an electromotive force into a coil 20' movable about a diameter of said coil 19' and controlled by the latitude meter 15'. As has been said above, the value of the displacement in longitude must be divided by the cosine of the latitude in order to give the value of the longitude itself. This correction term by which it is necessary to divide the displacement in longitude is therefore maximum at the equator (since at the equator the latitude is zero and its cosine equal to 1), and minimum at the limit of usual navigation, viz. for a latitude of 70°. The auxiliary correcting device will therefore be disposed in such a manner that for zero latitude the movable coil 20' shall make an angle of 70° with the fixed coil 19', and the characteristics of the coil 20 feeding the fixed frame 19' will be determined in such a manner, that in the said position the voltage given by the coil 21 feeding the latitude meter be equal to the voltage given by the coil 20' feeding the longitude meter, in such a manner that the coefficient of proportionality between the displacements measured in length units and those measured in angular units be the same for the two meters.

What I claim is:—

1. A device for measuring the displacements in longitude and in latitude of a ship, an air-ship or the like, comprising means for measuring the speed and the route angle, means for generating a voltage proportional to said speed, means for resolving said voltage into two components proportional respectively to the sine and to the cosine of the route angle, two integrating devices and means for actuating each one of said integrating devices respectively by one of the two said voltage components.

2. A device for measuring the displacements in longitude and in latitude of a ship, an air-ship or the like, comprising a speed indicator, a direct current generator, means for controlling the voltage of this generator by said speed indicator, two potentiometers connected in parallel to said generator, a slider movable along each of said potentiometers, a compass, a motor subjected to said compass, a disc termed cape-disc driven by said motor, two alidades at right angles, adapted to move in a parallel direction to themselves, a lug carried by said cape-disc and adapted to engage with said alidades, means for actuating the sliders of said potentiometers respectively by the displacements of said alidades, two volthourmeters, means for connecting each one of said meters respectively to one of said sliders.

3. A device for measuring the displacements in longitude and in latitude of a ship, an air-ship or the like, comprising a speed indicator, a direct current generator, means for controlling the voltage of said generator by the speed indicator, two potentiometers connected in parallel to said generator, a slider movable along each of said potentiometers, a compass, a motor subjected to said compass, a disc termed cape-disc driven by said motor, two alidades at right angles adapted to move in a parallel direction to themselves, a lug carried by said cape-disc and adapted to engage with said alidades, means for actuating the sliders of said potentiometers by the displacements of said alidades in a manner that each slider should be positioned at the middle point of its potentiometer when the corresponding component of the ship's speed is equal to zero, two volthourmeters adapted to measure the longitude and the latitude respectively, a resistance mounted in parallel with said generator, means for connecting each meter between one of said sliders and the middle point of said resistance.

4. A device for measuring the displacements in longitude and in latitude of a ship, an air-ship or the like, comprising a speed indicator, an alternating current generator, means for controlling the voltage of said generator by said speed indicator, a fixed coil connected to the terminals of said generator, a compass, a motor subjected to said compass, two coils at right angles and integral with one another adapted to rotate about a diameter of said fixed coil, means for controlling the rotation of these coils by said motor subjected to the compass, in a manner that the plane of each of said rotatable coils should form with the plane of said fixed coil an angle of 45° when the route angle is of 45°, two volthourmeters, means for connecting respectively each one of said meters to the terminals of the windings of one of said two movable frames.

5. A device for measuring the longitude and the latitude of a ship, an air-ship or the like, comprising means for measuring the speed and the route angle, means for producing a voltage proportional to the speed, means for resolving said voltage into two components respectively proportional to the sine and to the cosine of the route angle, two volthourmeters adapted to measure the latitude and the longitude respectively, means for feeding the latitude meter by the voltage component proportional to the sine of the route angle, means for feeding the longitude meter by a voltage proportional to the product of the component proportional to the cosine of the route angle by the converse of the cosine of the latitude.

6. A device for measuring the displacements in longitude and in latitude of a ship, an air-ship or the like, comprising a speed indicator, a direct current generator, means for controlling the voltage of said generator by said speed indicator, two potentiometers connected in parallel to said generator, a slider movable along each of said potentiometers, a compass, a motor subjected to said compass, a disc termed cape-disc driven by said motor, two alidades at right angles adapted to move in a parallel direction to themselves, a lug carried by said cape-disc and adapted to engage with said alidades, means for actuating the sliders of said potentiometers by the displacements of said two alidades in a manner that each said slider should be positioned at the middle point of its potentiometer when the corresponding component of the speed is equal to zero, two volthourmeters adapted to measure the longitude and the latitude respectively, a resistance mounted in parallel with said generator, means for connecting the latitude meter between the slider of the first potentiometer and the middle point of said resistance, a third potentiometer, on this potentiometer a slider, means for controlling said slider by said latitude meter, means for connecting said third potentiometer between the slider and the middle point of the second potentiometer, means for connecting the longitude meter between the slider of said third potentiometer and the middle point of the resistance.

7. A device for measuring the displacements in longitude and in latitude of a ship, an airship or the like, comprising a speed indicator, an alternating current generator, means for controlling the voltage of said generator by the speed indicator, a first fixed coil connected to the terminals of said generator, a compass, a motor subjected to this compass, two coils set at right angles and integral with one another, adapted to rotate about a diameter of said fixed coil, means for controlling the rotation of said coils by the motor subjected to the compass, in a manner that the plane of each of said rotatable coils should form with the plane of said fixed coil an angle of 45° when the route angle is equal to 45°, two volthourmeters adapted to measure the latitude and the longitude respectively, means for feeding the latitude meter from one of said movable coils, a second fixed coil connected in parallel with the second movable coil, inside said second fixed coil a third movable coil, means for setting in rotation said movable coil by said latitude meter, means for connecting the longitude meter to the terminals of the winding of said movable coil.

HENRY CLAUDE REYMOND.